US012724553B2

(12) United States Patent
Dai et al.

(10) Patent No.: US 12,724,553 B2
(45) Date of Patent: Sep. 1, 2026

(54) MEMORY ACCESS METHOD AND DEVICE FOR A NUMA SYSTEM

(71) Applicant: SAMSUNG ELECTRONICS CO., LTD., Suwon-si (KR)

(72) Inventors: Yuehua Dai, Xi'an Hi Tech Zone (CN); Lei Wang, Xi'an Hi Tech Zone (CN); Ying Xu, Xi'an Hi Tech Zone (CN); Mindong Zhao, Xi'an Hi Tech Zone (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 18/340,122

(22) Filed: Jun. 23, 2023

(65) Prior Publication Data

US 2023/0418484 A1 Dec. 28, 2023

(30) Foreign Application Priority Data

Jun. 27, 2022 (CN) ......................... 202210742277.6

(51) Int. Cl.
*G06F 3/06* (2006.01)

(52) U.S. Cl.
CPC .......... *G06F 3/0631* (2013.01); *G06F 3/0604* (2013.01); *G06F 3/0679* (2013.01)

(58) Field of Classification Search
CPC .... G06F 3/0631; G06F 3/0604; G06F 3/0679; G06F 9/546; G06F 2212/1024; G06F 12/1009; G06F 12/109; G06F 12/0284; G06F 2212/1056; G06F 2212/154; G06F 2212/2542; G06F 9/52; G06F 12/0692; G06F 9/5016
See application file for complete search history.

(56) References Cited

U.S. PATENT DOCUMENTS 5,796,605 A * 8/1998 Hagersten ............. G06F 15/173 711/143
5,887,138 A 3/1999 Hagersten et al.
(Continued)

FOREIGN PATENT DOCUMENTS

CN 102360345 2/2012
CN 102289390 11/2016
(Continued)

*Primary Examiner* — Arpan P. Savla
(74) *Attorney, Agent, or Firm* — Wolf, Greenfield & Sacks, P.C.

(57) ABSTRACT

A memory access method and device are provided for a Non-Uniform Memory Access (NUMA) system including nodes, each node configured to run a predetermined program and including a preset memory allocated for the predetermined program, where a same global physical address corresponds to each of the preset memories of each of the nodes, respectively, the method including: performing an operation on a first preset memory local to a first node of the nodes when the predetermined program is running on the first node; and synchronizing the operation performed on the first preset memory to each preset memory local to each of the nodes, respectively, where each of the nodes is configured to access its local preset memory using the same global physical address when running the predetermined program on the node.

20 Claims, 9 Drawing Sheets

(56) References Cited

U.S. PATENT DOCUMENTS

| | | | |
|---|---|---|---|
| 6,240,501 B1 * | 5/2001 | Hagersten | G06F 11/073 711/170 |
| 6,275,907 B1 | 8/2001 | Baumgartner et al. | |
| 6,351,795 B1 * | 2/2002 | Hagersten | G06F 11/0712 711/E12.066 |
| 6,871,219 B2 | 3/2005 | Noordergraaf et al. | |
| 6,941,440 B2 * | 9/2005 | Moll | G06F 13/1684 709/213 |
| 7,302,533 B2 | 11/2007 | Finnie et al. | |
| 7,472,233 B2 | 12/2008 | McKenney et al. | |
| 8,443,376 B2 | 5/2013 | Bhandari et al. | |
| 8,453,132 B2 | 5/2013 | Mannarswamy et al. | |
| 9,679,084 B2 * | 6/2017 | Loewenstein | G06F 16/904 |
| 2003/0217115 A1 * | 11/2003 | Rowlands | G06F 12/0817 709/214 |
| 2006/0206489 A1 | 9/2006 | Finnie et al. | |
| 2020/0117612 A1 * | 4/2020 | Gandhi | G06F 16/907 |

FOREIGN PATENT DOCUMENTS

| | | |
|---|---|---|
| CN | 104657198 | 12/2017 |
| CN | 104850461 | 5/2018 |
| KR | 10-0301702 | 10/2001 |

* cited by examiner

FIG. 1
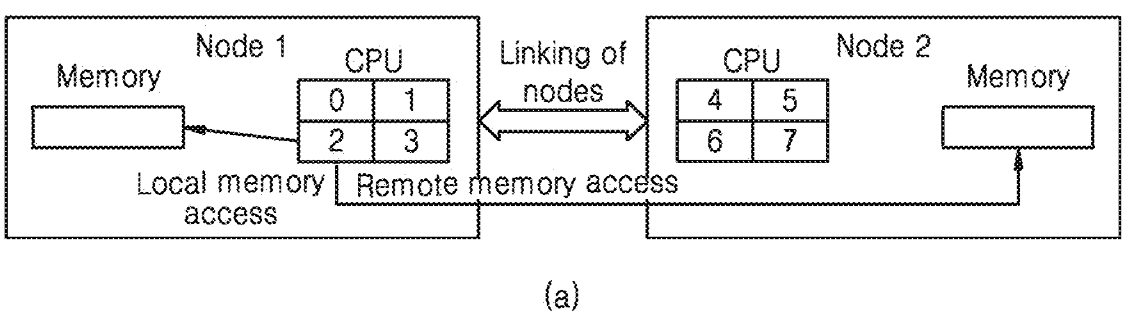
(a)
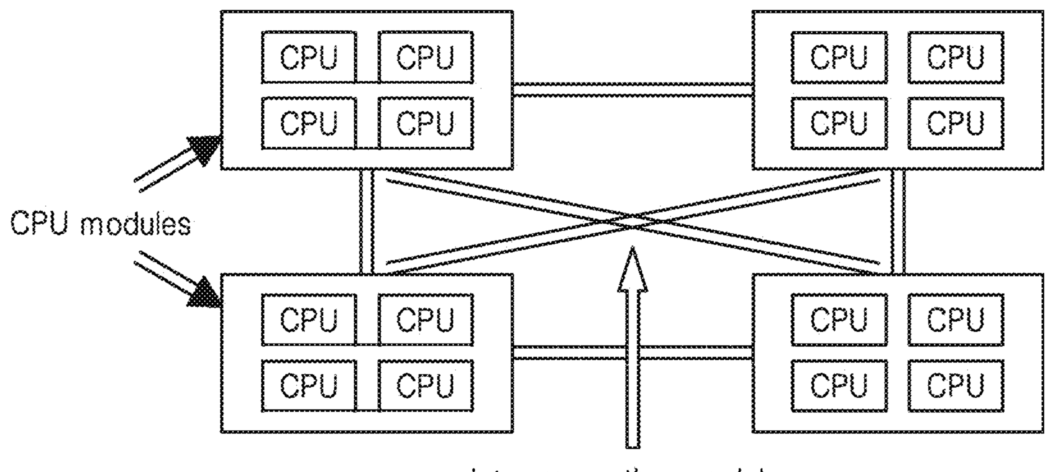
(b)
(Prior Art)

Figure 5:
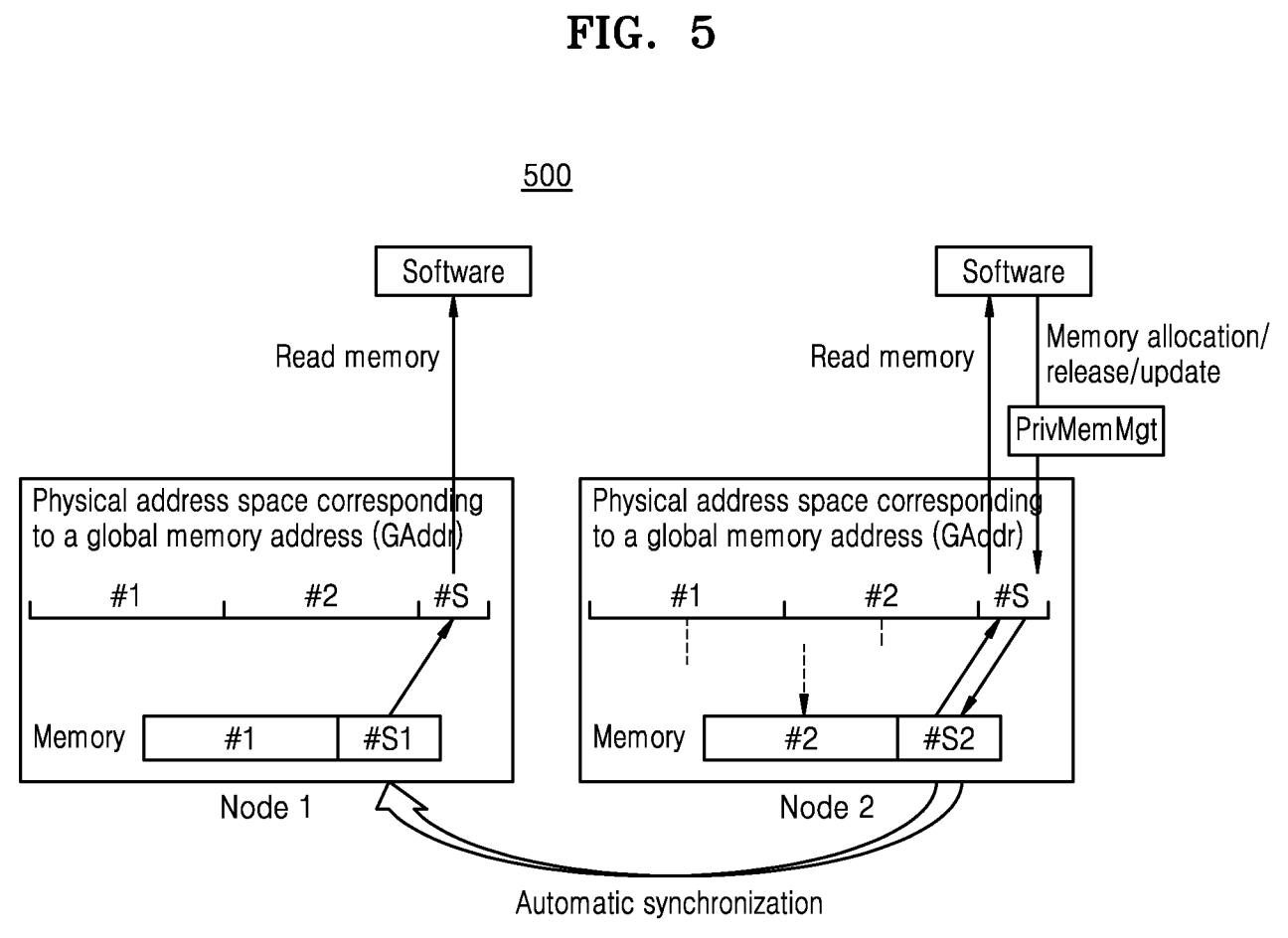

Software

Read memory

Physical address space corresponding to a global memory address (GAddr)

#1 #2 #S

Memory

#1 #S1

Node 1

Software

Memory allocation/release/update

PrivMemMgt

Read memory

Physical address space corresponding to a global memory address (GAddr)

#1 #2 #S

Memory

#2 #S2

Node 2

Automatic synchronization

Figure 6:
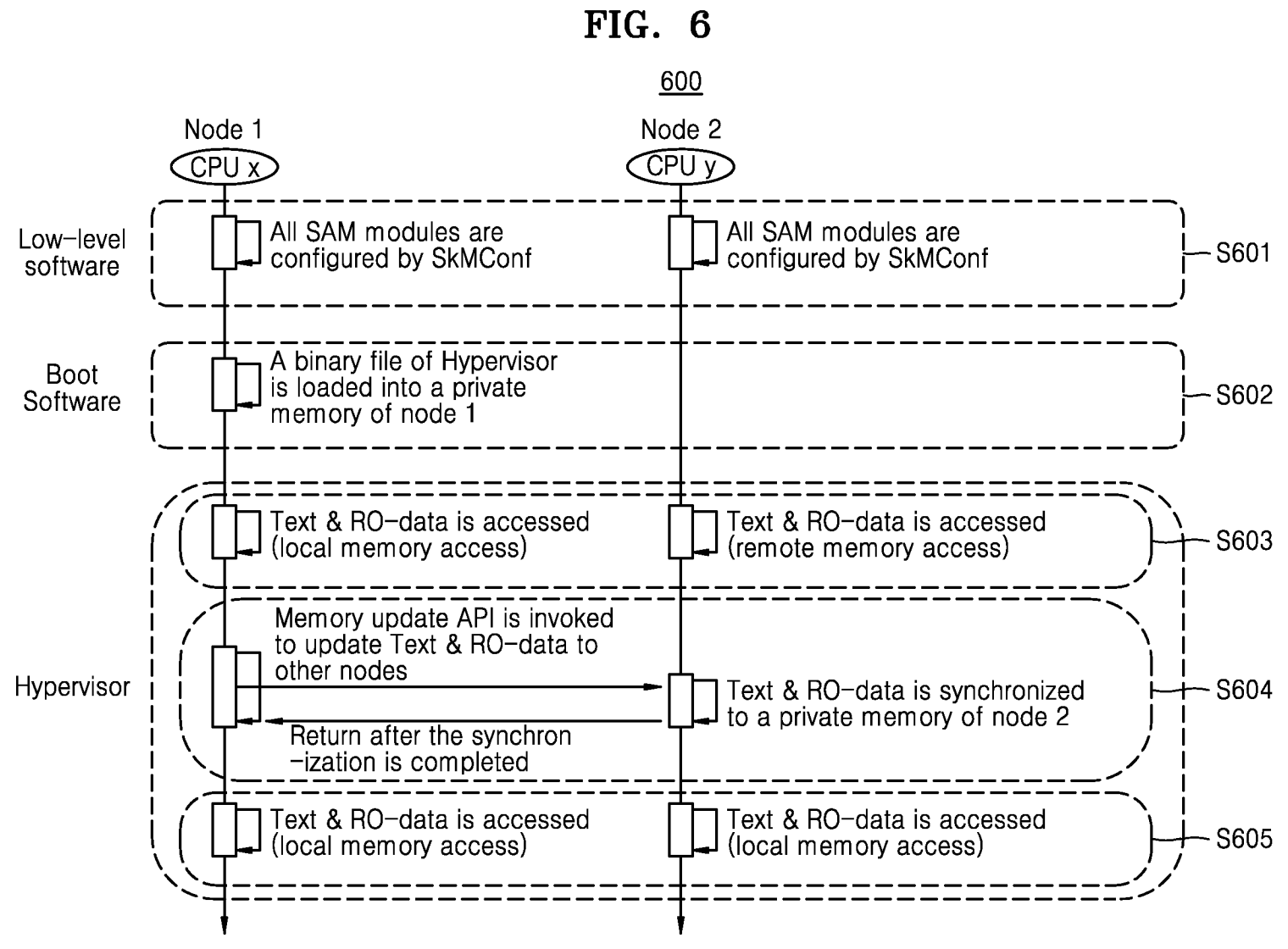

Node 1
CPU x
Node 2
CPU y

Low-level software
All SAM modules are configured by SkMConf
All SAM modules are configured by SkMConf
S601

Boot Software
A binary file of Hypervisor is loaded into a private memory of node 1
S602

Hypervisor
Text & RO-data is accessed (local memory access)
Text & RO-data is accessed (remote memory access)
S603

Memory update API is invoked to update Text & RO-data to other nodes
Text & RO-data is synchronized to a private memory of node 2
Return after the synchron-ization is completed
S604

Text & RO-data is accessed (local memory access)
Text & RO-data is accessed (local memory access)
S605

MEMORY ACCESS METHOD AND DEVICE FOR A NUMA SYSTEM

CROSS-REFERENCE

This application claims priority under 35 U.S.C. § 119 to Chinese Patent Application No. 202210742277.6, filed on Jun. 27, 2022 in the State Intellectual Property Office of the People's Republic of China (SIPO), the disclosure of which is incorporated by reference herein in its entirety.

FIELD

The present disclosure relates to memory access, and more particularly relates to a memory access method and device for a Non-Uniform Memory Access (NUMA) system.

DISCUSSION

A Non-Uniform Memory Access (NUMA) system may include a local memory and a remote memory based on the relative positions of a node and the memories. Central Processing Units (CPU) and like apparatus disposed at a node may access remote memories of other nodes, thereby potentially increasing access latency and/or reducing access performance.

SUMMARY

An embodiment of the present disclosure may provide a memory access method and/or device for a Non-Uniform Memory Access (NUMA) system, which may enable a node in a NUMA system to minimize or avoid remote memory access.

According to an embodiment of the present disclosure, a memory access method is provided for a Non-Uniform Memory Access (NUMA) system including a nodes, each node configured to run a predetermined program and including a preset memory allocated for the predetermined program, where a same global physical address corresponds to each of the preset memories of each of the nodes, respectively, the method including: performing an operation on a first preset memory local to a first node of the nodes when the predetermined program is running on the first node; and synchronizing the operation performed on the first preset memory to each preset memory local to each of the nodes, respectively, where each of the nodes is configured to access its local preset memory using the same global physical address when running the predetermined program on the node.

According to an embodiment, a memory access method is based on a NUMA system, wherein the NUMA system comprises at least two nodes, and a memory of each of nodes configured to run a predetermined program among the at least two nodes comprises a preset memory allocated for the predetermined program, a global physical address corresponding to the preset memory of the each of the nodes configured to run the predetermined program is the same, and the method comprises performing an operation on the preset memory of a first node of the nodes configured to run the predetermined program, when the predetermined program is running at the first node, and synchronizing the operation on the preset memory of the first node to the preset memory of other nodes of the nodes configured to run the predetermined program, so that any of the other nodes accesses a local preset memory when running the predetermined program.

Since the same global physical address corresponds to a local physical memory of each node, and the local physical memory of each node is updated synchronously, when software runs at different nodes, a program of the software having a continuous global physical address space can be guaranteed, thereby avoiding complicated operations of migrating or backing up of page table pages.

Alternatively, the operation comprises at least one of requesting the first node to allocate a first physical address at the preset memory for the predetermined program to store data, requesting the first node to update data stored in a second physical address of the preset memory by the predetermined program, and requesting the first node to release data stored in a third physical address of the preset memory by the predetermined program.

Alternatively, when the operation is the requesting of the first node to allocate the first physical address at a preset memory for the predetermined program to store data, the synchronizing of the operation performed on the preset memory of the first node to the preset memory of the other nodes comprises sending a first synchronization message to the other nodes, so that the other nodes allocate the first physical address at the preset memory for the predetermined program and store data. When the operation is the requesting of the first node to update the data stored in the second physical address of the preset memory by the predetermined program, the synchronizing of the operation performed on the preset memory of the first node to the other nodes comprises sending a second synchronization message to the other nodes, so that the other nodes update the data stored in the second physical address of the preset memory by the predetermined program. When the operation is the requesting of the first node to release the data stored in the third physical address of the preset memory by the predetermined program, synchronizing of the operation performed on the preset memory of the first node to the other nodes comprises sending a third synchronization message to the other nodes, so that the other nodes release the data stored in the third physical address of the preset memory by the predetermined program.

According to an embodiment of the present disclosure, a memory access device is provided for a Non-Uniform Memory Access (NUMA) system including a nodes, each node configured to run a predetermined program and including a preset memory allocated for the predetermined program, where a same global physical address corresponds to each of the preset memories of each of the nodes, respectively, the device including: an operation module configured to perform an operation on a first preset memory local to a first node of the nodes when the predetermined program is running on the first node; and a synchronization module configured to synchronize the operation performed on the first preset memory to each preset memory local to each of the nodes, respectively, where each of the nodes is configured to access its local preset memory using the same global physical address when running the predetermined program on the node.

According to an embodiment, when an application performs an operation of writing new data, updating data, and/or deleting data at one node, the method of the present disclosure synchronizes the operation to other nodes through synchronization messages, while the node running the application can avoid remote access when the application is running at the node, since the memory of each node corresponding to the application has the same global physical address.

Alternatively, the method further comprises configuring the preset memory for the predetermined program in the nodes configured to run the predetermined program.

Alternatively, the configuring of the preset memory for the predetermined program in the nodes configured to run the predetermined program comprises configuring the preset memory for the predetermined program in a System Address Mapping (SAM) table of the nodes configured to run the predetermined program.

Alternatively, substantially all of the nodes comprised in the NUMA system may be nodes that are configured to run the predetermined program.

According to an embodiment, a memory access device may be based on a NUMA system, wherein the NUMA system comprises at least two nodes, wherein a memory of each of nodes configured to run a predetermined program among the at least two nodes comprises a preset memory allocated for the predetermined program, a global physical address corresponding to the preset memory of the each of the nodes configured to run the predetermined program is the same, and the device comprises an operation module configured to perform an operation on the preset memory of a first node of the nodes configured to run the predetermined program when the predetermined program is running at the first node, and a synchronization module configured to synchronize the operation on the preset memory of the first node to the preset memory of other nodes of the nodes configured to run the predetermined program, so that any of the other nodes accesses a local preset memory when running the predetermined program.

Since the same global physical address corresponds to a local physical memory of each node, and the local physical memory of each node is updated synchronously, and when a software runs at different nodes, a program of the software having a continuous global physical address space can be guaranteed, thereby avoiding complicated operations of migrating or backing up of page table pages.

Alternatively, the operation module is configured to perform at least one of requesting the first node to allocate a first physical address to store data at the preset memory for the predetermined program, requesting the first node to update data stored in a second physical address of the preset memory by the predetermined program, and requesting the first node to release data stored in a third physical address of the preset memory by the predetermined program.

Alternatively, when the operation module is configured to request the first node to allocate the first physical address at a preset memory to store data for the predetermined program, the synchronization module is configured to send a first synchronization message to the other nodes, so that the other nodes allocate the first physical address at the preset memory for the predetermined program and store data. When the operation module is configured to request the first node to update the data stored in the second physical address of the preset memory by the predetermined program, the synchronization module is configured to send a second synchronization message to the other nodes, so that the other nodes update the data stored in the second physical address of the preset memory by the predetermined program. When the operation module is configured to request the first node to release the data stored in the third physical address of the preset memory by the predetermined program, the synchronization module is configured to send a third synchronization message to the other nodes, so that the other nodes release the data stored in the third physical address of the preset memory by the predetermined program.

According to an embodiment, when an application performs an operation of writing new data, updating data, and/or deleting data at one node, the method of the present disclosure synchronizes the operation to other nodes through synchronization messages, while a memory of each node corresponding to the application has the same global physical address, so that the node running the application can avoid a remote access when the application is running at the node.

Alternatively, the device further comprises a configuration module configured to configure the preset memory for the predetermined program in the nodes configured to run the predetermined program.

Alternatively, the configuration module is configured to configure the preset memory for the predetermined program in a System Address Mapping (SAM) table of the nodes configured to run the predetermined program.

Alternatively, substantially all of the nodes comprised in the NUMA system may be nodes that are configured to run the predetermined program.

According to an embodiment of the present disclosure, a Non-Uniform Memory Access (NUMA) system is provided, including: nodes each configured to run a predetermined program, and a preset memory local to the node and allocated for the predetermined program, where a same global physical address corresponds to each preset memory of each of the nodes, respectively; an operation module configured to perform an operation on a first preset memory local to a first node of the nodes when the predetermined program is running on the first node; and a synchronization module configured to synchronize the operation performed on the first preset memory to each preset memory local to each of the nodes, respectively, where each of the nodes is configured to access its local preset memory using the same global physical address when running the predetermined program on the node.

The system may be applied where the operation module is configured to perform at least one of requesting the first node to allocate a first physical address at the preset memory for the predetermined program to store data; requesting the first node to update data stored in a second physical address of the preset memory by the predetermined program; or requesting the first node to release data stored in a third physical address of the preset memory by the predetermined program.

The system may be applied where, when the operation module is configured to request the first node to allocate the first physical address at a preset memory for the predetermined program to store data, the synchronization module is configured to send a first synchronization message to the other nodes, so that the other nodes allocate the first physical address at the preset memory for the predetermined program and store data; when the operation module is configured to request the first node to update the data stored in the second physical address of the preset memory by the predetermined program, the synchronization module is configured to send a second synchronization message to the other nodes, so that the other nodes update the data stored in the second physical address of the preset memory by the predetermined program; when the operation module is configured to request the first node to release the data stored in the third physical address of the preset memory by the predetermined program, the synchronization module is configured to send a third synchronization message to the other nodes, so that the other nodes release the data stored in the third physical address of the preset memory by the predetermined program.

The system may further include a configuration module configured to configure the preset memory for the predetermined program in the nodes configured to run the predetermined program. The system may be applied where the configuration module is configured to configure the preset memory for the predetermined program in a System Address Mapping (SAM) table of nodes configured to run the predetermined program. The system may be applied where the nodes configured to run the predetermined program are all of the nodes comprised in the NUMA system. The system may be applied where at least one of the nodes includes memory in addition to its preset memory. The system may be applied where at least one of the nodes includes at least one processor or core.

According to an embodiment, a computer-readable storage medium is provided storing a computer program, that when executed by a processor, implements a memory access method based on the NUMA system as otherwise described above.

According to an embodiment of the present disclosure, a data storage device is provided, comprising a processor and a memory for storing a computer program, that when executed by a processor, implements a memory access method based on the NUMA system as otherwise described above.

BRIEF DESCRIPTION OF THE DRAWINGS

The above and other embodiments of the present disclosure will become more apparent from the following description taken in conjunction with the accompanying drawings, in which:

FIG. 1 is a block diagram illustrating an example of multiple nodes in a Non-Uniform Memory Access (NUMA) system;

FIG. 5 is a hybrid diagram illustrating the workflow of a private memory management (PrivMemMgt) program or module;

FIG. 6 is a flowchart diagram illustrating an example of a method for memory management according to an embodiment of the present disclosure;

DETAILED DESCRIPTION

Figure 2:
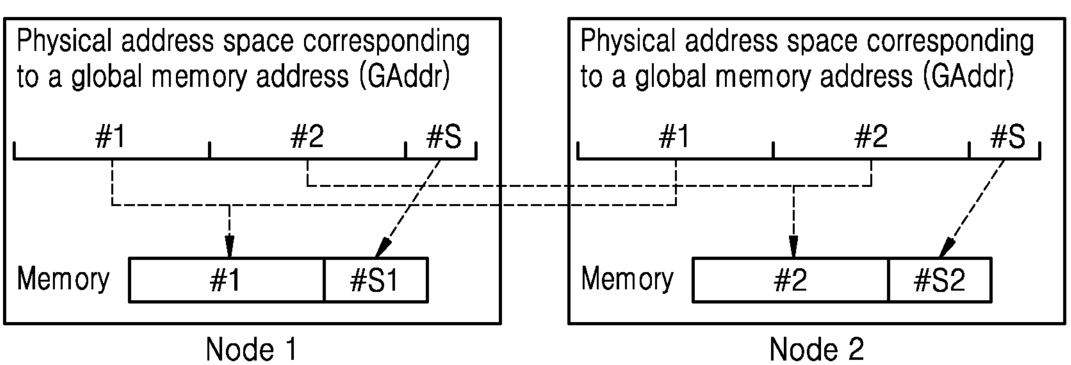
FIG. 2 is a hybrid diagram illustrating an example of a mapping relationship between a global physical address space and a memory according to an embodiment of the present disclosure.

Embodiments of the present disclosure are described with reference to the accompanying drawings, in which like reference numerals may be used to depict the same or similar elements, features, and structures. However, the present disclosure is not intended to be limited by the particular embodiments described herein, rather it is intended that the present disclosure covers modifications, equivalents, and/or alternatives of the described embodiments that come within the scope of the appended claims and their equivalents.

The terms and words used in the following description and claims are not limited to their dictionary meanings, but are used to enable a clear and consistent understanding of the present disclosure. Accordingly, it should be apparent to those skilled in the art that the following description of embodiments of the present disclosure is provided for illustrative purposes and not for the purpose of limiting the present disclosure as defined by the appended claims and their equivalents.

It is to be understood that the singular forms include plural forms, unless the context clearly dictates otherwise. The terms "include," "comprise," and "have", used herein, indicate disclosed functions, operations, or the existence of elements, but do not exclude other functions, operations, or elements.

In various embodiments of the present disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

As shown in FIG. 1, a Non-Uniform Memory Access (NUMA) system with multiple nodes is indicated generally by the reference numeral 100. In FIG. 1, part (a), nodes may have substantially the same architecture and may be connected together based on a system bus, for example, in an embodiment of a NUMA system. For nodes with different architectures, these may be connected through a Cache Coherent Interconnect for Accelerators (CCIX) protocol, for example. In such a NUMA system based on the CCIX protocol, nodes may be connected to each other based on PCI Express (PCIe). Remote memory access, such as PCIe or the like, may have higher latency, which may have a greater influence on system performance. For example, referring to FIG. 1, part (b), a NUMA system comprises four (4) nodes, and each node may include a memory and four (4) Central Processing Units (CPU). When a node (e.g., node 0) accesses other nodes (e.g., node 1 to node 3), the node accessing memory in other nodes may result in higher latency than the node accessing its own memory.

Methods for improving access performance may include, for example, Node-Aware Memory Allocation, Memory Migration, Memory Backup, or the like.

In Node-Aware Memory Allocation (NAMA) methods, a system preferentially allocates a local memory to an application, and if the local memory runs out, the system allocates memories nearby according to the location of the node on which the application is running, thereby reducing the remote memory access.

In Memory Migration (MM) methods, when an application is migrated to a new node, the system migrates a memory allocated to the application by the initial node to a memory of the new node, and releases the memory of the initial node, which also reduces the remote memory access.

In Memory Backup (MB) methods, the system allocates a memory to an application at substantially all nodes and ensures that substantially all nodes have consistent memory backups. No matter which node the application is running on, the application accesses a local memory without accessing a remote memory.

However, the NAMA and MM methods are mainly for an application, and may be inapplicable to system software such as an operating system or a virtual machine monitor, at least because codes and data of the system software are shared by the applications of substantially all nodes. If a memory for the system software is allocated at a specific node or migrated to a specific node, it causes other nodes to perform a remote access the memory for the system software, which reduces the running performance of the system software at the other nodes.

For the MB methods, in order to ensure that the software has a continuous address space when running, it uses virtual address remapping to maintain an independent and complete page table at each node, and an update of any page table is synchronized to page tables of other nodes, which burdens the system.

Table 1, below, shows an example of a System Administration Management (SAM) table of a node in a Non-Uniform Memory Access (NUMA) system.

TABLE 1

| | Physical address space | Target physical apparatus |
|---|---|---|
| 1 | Register address space for Apparatus 1 | Apparatus 1 |
| 2 | Register address space for Apparatus 2 | Apparatus 2 |
| 3 | Address space corresponding to substantially all memory | Memory(Memory Controller) |

Referring to the Table 1, the SAM table includes respective components of a global physical address space of the NUMA system and the target physical apparatus corresponding to respective components. For example, when the master apparatus of a node, such as, for example, a CPU or a data management (e.g., DMA or Data Management) apparatus accesses a physical address, a specific apparatus to be accessed can be found according to the physical address, so that the access request of the master apparatus reaches the correct apparatus. For example, a node may access an Apparatus 1 through an address in the physical address space corresponding to the Apparatus 1, and access a memory corresponding to the address through the address in the physical address space corresponding to the memory. As an example, the SAM table may be maintained by a SAM module in the node. Since the physical addresses in the SAM table are global to the NUMA system, and each address corresponds to a unique target physical apparatus, a mapping relationship between the physical address space and the target physical apparatus is the same in the SAM table of each node.

As described above, since each address in the global physical address space corresponds to a unique target physical apparatus (for example, Apparatus 1, Apparatus 2, or the memory), when software runs on different nodes according to the memory backup or MB methods, the physical address space corresponding to the software will not be contiguous. For example, a section of global physical address space used by the software running at Node 1 is different from a section of the global physical address space used by the software running at Node 2. Since the global physical addresses assigned to the software by each node running the software are different, it would be necessary to maintain an independent and complete page table for the software at each node running the software. When the software migrates from one node to another node, it would be necessary to synchronize the page table, including an action of refreshing the page table, of the software in the initial node (i.e., one node) to the node (i.e., the other node) to be migrated, which burdens the page table management.

According to an embodiment of the present disclosure, a section of continuous global physical address space may be defined or selected for software, such as system software and/or application software, and the section of continuous global physical address space may be mapped to a local physical memory of each node, wherein the local physical memory corresponding to the global physical address space of each node is effectively a memory backup for each other node. In this way, when the software runs at different nodes, the local memory corresponding to the section of the global physical address of the nodes running the software can be accessed through the section of the global physical address.

According to an embodiment of the present disclosure, since the local physical memory corresponding to the section of the global physical address space of each node is mapped to the same section of the global physical address space, the global physical addresses used by the software, when the software runs, are the same or consecutive for different nodes, thereby avoiding complex operations on page tables.

As an example, a section of special address space GAddr #S may be defined or selected in the global physical address space, and a section of a memory of each node may be designated as the target physical device of GAddr #S. That is, GAddr #S is mapped to a section of private local physical Memory #S of each node. Through this mapping relationship, GAddr #S corresponds to the section of private local physical Memory #S of each node of the NUMA system, wherein the section of the private local memory of each node is a memory backup for each other node.

Turning to FIG. 2, a mapping relationship is indicated generally by the reference numeral 200. FIG. 2 illustrates an example of a mapping relationship between a global physical address space and a memory according to an embodiment of the present disclosure.

Referring to FIG. 2, GAddr #S is a global memory address that corresponds to a section of private local physical Memory #S1 of Node 1, and also corresponds to a section of private local physical Memory #S2 of Node 2, wherein the local physical memory #S1 of Node 1 and the local physical memory #S2 of Node 2 correspond to memory backups for each other.

It shall be understood that Node 1 and Node 2 are illustrated examples, but other nodes in the NUMA system also have a private local physical Memory #S corresponding to GAddr #S, and the local physical Memory #S corresponding to GAddr #S of each node is effectively a memory backup for each other node.

According to an embodiment of the present disclosure, by mapping the same global physical address space GAddr #S to a section of private local physical Memory #S of each node, when a program runs at a current node, the local physical memory #S corresponding to GAddr #S of the current node can be accessed through GAddr #S. In this way, if a section of private physical Memory #S corresponding to GAddr #S of each node backs up each other node, then when the program runs at each node, if addresses in GAddr #S are accessed, the local physical memory corresponding to the addresses of the current node can be invoked, thereby avoiding remote memory access. In addition, since each memory backup corresponds to the same global physical address space, it can ensure that the program has a continuous physical address space, thereby avoiding complex operations of migrating or backing up page table pages.

A method for implementing the private local physical memory of each node to be a memory backup for each other node is described below.

Hereinafter, for convenience of description, "global physical address space" may refer to a section of global physical address space GAddr #S set or selected for software or a section of global physical address space corresponding to the private local physical Memory #S of each node.

As described above, according to an embodiment of the present disclosure, a NUMA system includes at least two nodes, and a memory of each of the nodes is configured to run a predetermined program among the at least two nodes that each includes a preset memory (e.g., #S1 and #S2) allocated for the predetermined program, and the global physical address is the same corresponding to the preset memory of each node of the nodes configured to run the predetermined program.

Figure 3:
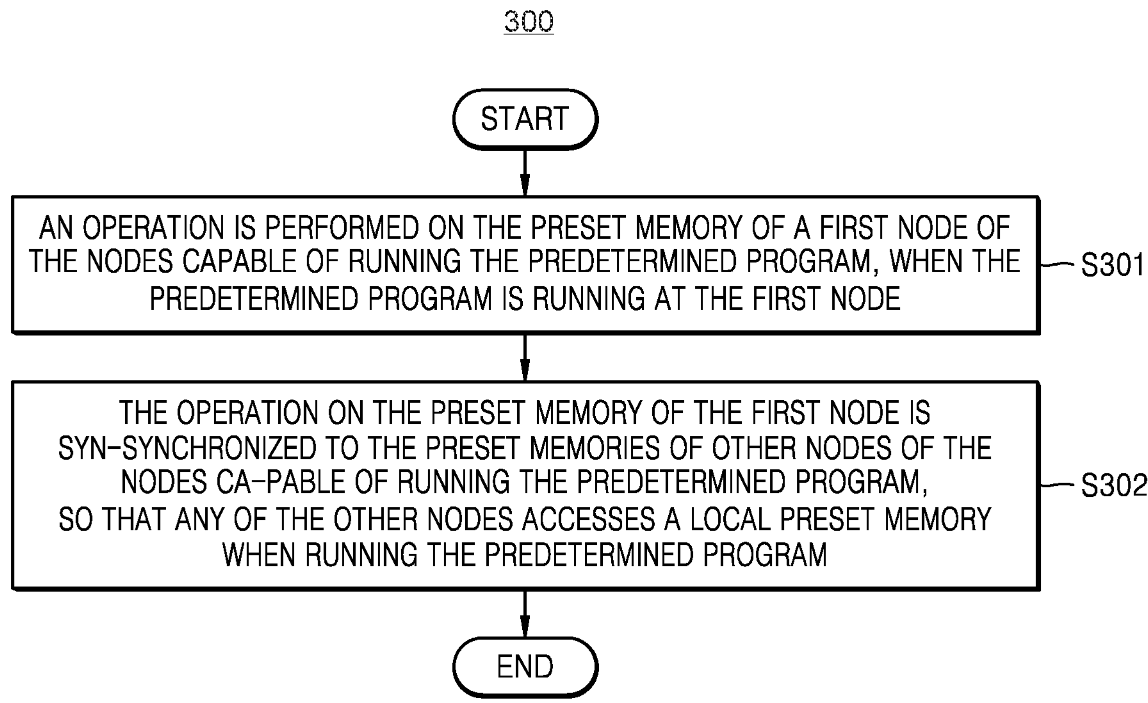
FIG. 3 is a flowchart diagram illustrating a memory access method based on a NUMA system according to an embodiment of the present disclosure.

Turning now to FIG. 3, a memory access method is indicated generally by the reference numeral 300. FIG. 3 illustrates a memory access method based on a NUMA system according to an embodiment of the present disclosure.

In step S301, when the predetermined program is running at a first node of the nodes configured to run the predetermined program, an operation is performed on the preset memory of the first node.

As an example, the operation comprises at least one of requesting the first node to allocate a first physical address at the preset memory for the predetermined program to store data, requesting the first node to update data stored in a second physical address of the preset memory by the predetermined program, or requesting the first node to release data stored in a third physical address of the preset memory by the predetermined program.

In step S302, the operation on the preset memory of the first node is synchronized to the preset memory of other nodes of the nodes configured to run the predetermined program, so that any of the other nodes accesses a local preset memory rather than a remote memory when running the predetermined program.

As an example, when the operation is the requesting of the first node to allocate the first physical address at a preset memory to store data for the predetermined program, the synchronizing of the operation performed on the preset memory of the first node to the preset memory of the other nodes comprises sending a first synchronization message to the other nodes, so that the other nodes allocate the first physical address at the preset memory for the predetermined program and store data.

As an example, when the operation is the requesting of the first node to update the data stored in the second physical address of the preset memory by the predetermined program, the synchronizing of the operation performed on the preset memory of the first node to the other nodes comprises sending a second synchronization message to the other nodes, so that the other nodes update the data stored in the second physical address of the preset memory by the predetermined program.

As an example, when the operation is the requesting of the first node to release the data stored in the third physical address of the preset memory by the predetermined program, the synchronizing of the operation performed on the preset memory of the first node to the other nodes comprises sending a third synchronization message to the other nodes, so that the other nodes release the data stored in the third physical address of the preset memory by the predetermined program.

According to an embodiment of the present disclosure, when a node manages its own memory #S, the management action is synchronized to other nodes, thereby ensuring that the memory #S of each node is mutually backed up.

As an example, the method further comprises configuring the preset memory for the predetermined program in the nodes configured to run the predetermined program.

As an example, the nodes configured to run the predetermined program are substantially all of the nodes comprised in the NUMA system.

To facilitate understanding of the present disclosure, Nodes 1 and 2 are taken as examples for description, without limitation thereto.

When the Node 1 manages the local memory of the Node 1 corresponding to an address in the global physical address space through the address, information indicating the management action may be sent to the Node 2, so that the Node 2 performs the same operation action on the local physical memory of the Node 2 corresponding to the address according to the information, thereby ensuring that the local memory of the Node 1 corresponding to the address and the local memory of Node 2 corresponding to the address are mutually backed up.

In order to ensure that the memory # of Node 1 and the memory # of Node 2 are mutual memory backups for each other, when the Node 2 performs a management action on the local memory of the Node 2 corresponding to the address in the global physical address space, the Node 2 may send information indicating the management action to the Node 1, and when the Node 1 receives the information, the management action can be performed on the local physical memory of the Node 1 corresponding to the address according to the information.

In the above manner, the local physical memory corresponding to the global physical address space of each node is managed synchronously, thereby ensuring that the local physical memory of each node is a backup memory for each other node.

As an example, the configuring of the preset memory for the predetermined program in the nodes configured to run the predetermined program comprises: configuring the preset memory for the predetermined program in a System Address Mapping (SAM) table of the nodes configured to run the predetermined program. That is, the same global physical address space may be mapped to the local physical memory of each node through the SAM table of each node.

As an example, Table 2 shows an example of a mapping relationship in the SAM table of Node 1.

TABLE 2

| | Physical address space | Target physical apparatus |
|---|---|---|
| 1 | Register address space for Apparatus 1 | Apparatus 1 |
| 2 | Register address space for Apparatus 2 | Apparatus 2 |
| 3 | Address space GAddr #1 corresponding to memory #1 | Memory #1 of Node 1 |
| 4 | Address space GAddr #2 corresponding to memory #2 | Memory #2 of node 2 |
| 5 | GAddr #S | Memory #S1 of Node 1 |

Referring to Table 2, the global physical address space GAddr #S in the SAM table of Node 1 is mapped to Memory #S1 of Node 1.

Table 3 shows an example of a mapping relationship in the SAM table of Node 2.

TABLE 3

| | Physical address space | Target physical apparatus |
|---|---|---|
| 1 | Register address space for Apparatus 1 | Apparatus 1 |
| 2 | Register address space for Apparatus 1 | Apparatus 2 |
| 3 | Address space GAddr #1 corresponding to memory #1 | Memory #1 of Node 1 |
| 4 | Address space GAddr #2 corresponding to memory #2 | Memory #2 of node 2 |
| 5 | GAddr #S | Memory #S2 of node 2 |

Referring to Table 3, the global physical address space GAddr #S in the SAM table is mapped to Memory #S2 of Node 2.

Figure 4:
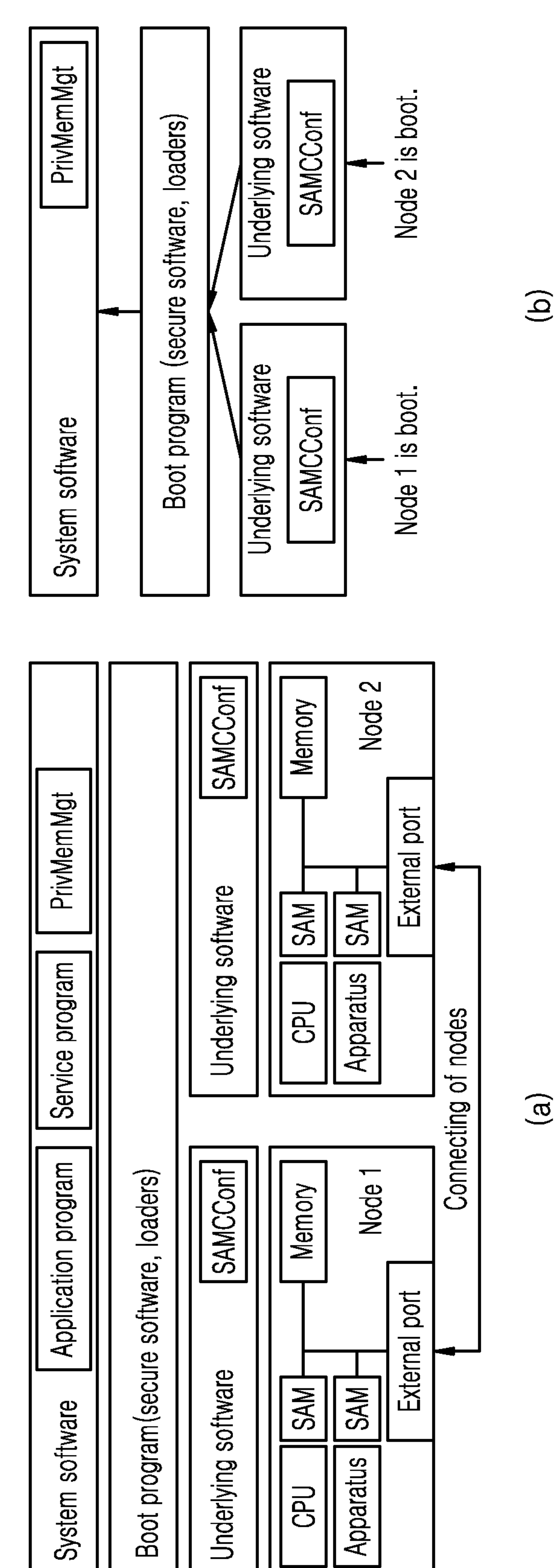
FIG. 4 is a schematic diagram illustrating an example of a configuration of a NUMA system according to an embodiment of the present disclosure.

As shown in FIG. 4, a NUMA system is indicated generally by the reference numeral 400. FIG. 4 illustrates an example of a configuration of a NUMA system according to an embodiment of the present disclosure.

Referring to FIG. 4, part (a), the NUMA system may include a Node 1 and a node 2, wherein each node includes a CPU, a device, a memory, an external port, and a system address mapping (SAM) component, wherein the Node 1 and the Node 2 are connected through the external port. It shall be understood that the NUMA system may additionally include other components, at least one of the components included in the NUMA system may be omitted, and at least one of the components included in the NUMA system may be combined and/or split, without limitation thereto.

When the NUMA system runs, it may involve three software modules of underlying software such as the system address mapping configuration module SAMConf, a boot program including secure software and/or loaders, and system software including private memory management (PrivMemMgt) programs or modules.

Referring to FIG. 4, part (b), when the Node 1 and the Node 2 are booted, the SAMConf corresponding to each node configures the SAM table of that node to map the global physical address space to the respective local physical memory. For example, the SAMConf of Node 1 maps the global physical address space GAddr #S to the memory #1 of Node 1, and the SAMConf of Node 2 maps the global physical address space GAddr #S to the memory #2 of Node 2.

As an example, after the SAM table of the node is configured, the boot program loads Text & RO-Data of a predetermined program in the form of binary files into the Memory #S of at least one of the booted nodes. For example, when the predetermined program runs at the Node 1 at first, the boot program may load the Text & RO-Data of the predetermined program into the Memory #S of the Node 1 in the form of binary files. As an example, a PrivMemMgt module may manage Memory #S of each node (e.g., memory allocation, memory update, memory release).

Turning to FIG. 5, workflow of a private memory management program or module is indicated generally by the reference numeral 500. FIG. 5 shows the workflow of the private memory management (PrivMemMgt) module. Referring to FIG. 5, when a new management action is performed on the Memory #S of Node 1, the PrivMemMgt module synchronizes the management action to the Memory #S of Node 2, and similarly, when a new management action is performed on the memory of Node 2, the PrivMemMgt module synchronizes the management action to the Memory #S of Node 1.

In order to explain the present disclosure, the operation process of a Virtual Machine Monitor (VMM) Hypervisor is described as an example.

When a NUMA system is booted, the underlying software runs at each node. At this time, the SAMConf module may initialize substantially all SAM tables to define the same special address space GAddr #S in each node and map it to a private physical memory #S of that node.

In addition, when the Hypervisor is booted, the PrivMemMgt module establishes a synchronization channel between the nodes.

Taking the hypervisor running firstly at Node 1 as an example, the Text & RO-Data of the Hypervisor is loaded into the memory #S of Node 1 in the form of binary files, and the PrivMemMgt module invokes the memory update Application Programming Interface (API) to synchronize the Text & RO-Data to the private memory of other nodes. That is, when the Text & RO-Data is loaded into memory #S of Node 1, the Text & RO-Data is also loaded into memory #S of Node 2, thereby ensuring that the Node 1 memory #S1 and the Node 2 memory #S2 are backup memories for each other.

Figure 7:
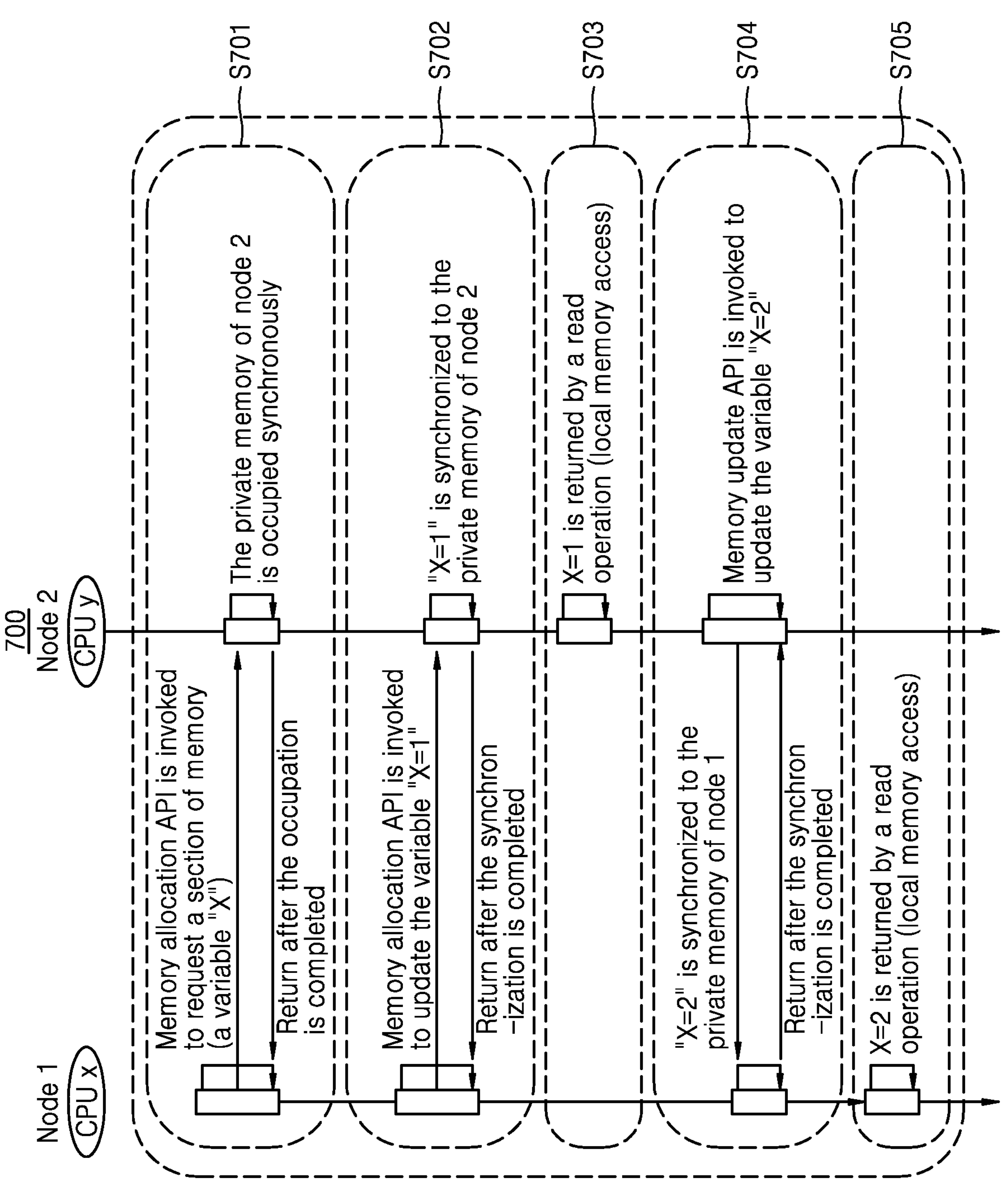
FIG. 7 is a flowchart diagram illustrating an example of a method for memory management according to an embodiment of the present disclosure.

FIGS. 6 and 7 illustrate an example method of memory management according to an embodiment of the present disclosure.

Turning now to FIG. 6, a method for memory management is indicated generally by the reference numeral 600. Referring to FIG. 6, in step S601, a SAM table of each node is configured with a SAMConf corresponding to that node. For example, in step S601, the SAMConf of Node 1 maps the global physical address space GAddr #S to the memory #S1 of the Node 1, and the SAMConf of Node 2 maps the global physical address space GAddr #S to the memory #S2 of the Node 2.

In step S602, the boot program loads the Hypervisor's Text & RO-Data into the private memory of the Node 1 in the form of binary files.

In step S603, when the Hypervisor is running at the Node 1, accessing the Text & RO-Data is a local memory access, and when the Hypervisor is running at the Node 2, accessing the Text & RO-Data is a remote memory access.

In step S604, the PrivMemMgt module invokes the memory update API to update the Text & RO-Data to the Node 2, the Node 2 loads the Text & RO-Data into the private memory of the Node 2, and returns the synchronization result to the Node 1.

In step S605, the accessing the Text & RO-Data by each of the Node 1 and Node 2 is now a local memory access in both cases.

As shown in FIG. 7, a method for memory management is indicated generally by the reference numeral 700. Referring to FIG. 7, in step S701, the PrivMemMgt module invokes a memory request API at the Node 1 to request a section of memory for storing variable X, and synchronizes the request to the Node 2.

In step S702, the PrivMemMgt module invokes a memory update API at Node 1 to update the variable "X=1", and synchronizes the update action to the Node 2, and the Node 2 returns the synchronization execution result to the Node 1.

In step S703, the Node 1 reads X, which is a local memory access.

In step S704, the PrivMemMgt module invokes a memory update API at the Node 2 to update the variable "X=2", and synchronizes the update action to the Node 1, and the Node 1 returns the synchronization execution result.

In step S705, the Node 1 accesses X based on the local memory access.

According to an embodiment of the present disclosure, when the Hypervisor reads the variable X at any node, it can substantially always read the latest value of X in the manner of a local memory access.

The memory access method based on a NUMA system according to an embodiment of the present disclosure is described above with reference to FIGS. 1 to 7. A memory access device based on a NUMA system according to an embodiment of the present disclosure will be described below with reference to FIG. 8.

Figure 8:
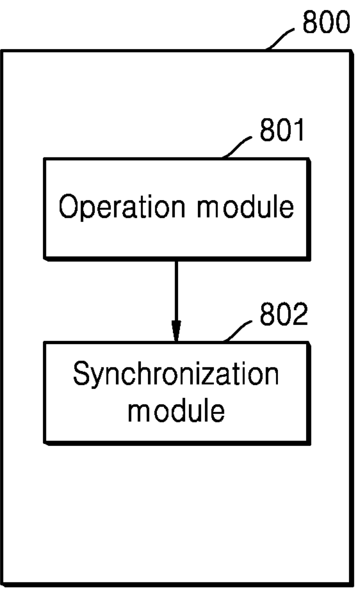
FIG. 8 is a block diagram illustrating a structure of a memory access device for a NUMA system according to an embodiment of the present disclosure.

Turning to FIG. 8, a memory access device is indicated generally by the reference numeral 800. FIG. 8 illustrates a structure of a memory access device 800 for a NUMA system according to an embodiment of the present disclosure. Referring to FIG. 8, the device 800 may include an operation module 801 and a synchronization module 802. It shall be understood that the device 800 may additionally include other components, and the components included in the device 800 may be combined or split, without limitation thereto.

As an example, when the predetermined program is running at a first node of the nodes configured to run the predetermined program, the operation module 801 may be configured to perform an operation on the preset memory of the first node.

As an example, the operation module 801 may be configured to perform at least one of requesting the first node to allocate a first physical address to store data at the preset memory for the predetermined program, requesting the first node to update data stored in a second physical address of the preset memory by the predetermined program, and/or requesting the first node to release data stored in a third physical address of the preset memory by the predetermined program.

As an example, the synchronization module 802 may be configured to synchronize the operation on the preset memory of the first node to the preset memory of other nodes of the nodes configured to run the predetermined program, so that any of the other nodes accesses a local preset memory when running the predetermined program.

As an example, when the operation module 801 is configured to request the first node to allocate the first physical address at a preset memory to store data for the predetermined program, the synchronization module 802 is configured to send a first synchronization message to the other nodes, so that the other nodes allocate the first physical address at the preset memory for the predetermined program and store data. When the operation module 801 is configured to request the first node to update the data stored in the second physical address of the preset memory by the predetermined program, the synchronization module 802 is configured to send a second synchronization message to the other nodes, so that the other nodes update the data stored in the second physical address of the preset memory by the predetermined program. When the operation module 801 is configured to request the first node to release the data stored in the third physical address of the preset memory by the predetermined program, the synchronization module 802 is configured to send a third synchronization message to the other nodes, so that the other nodes release the data stored in the third physical address of the preset memory by the predetermined program.

As an example, the device 800 may further include a configuration module, and the configuration module may be configured to configure the preset memory for the predetermined program in the nodes configured to run the predetermined program.

As an example, the configuration module may be configured to configure the preset memory for the predetermined program in a System Address Mapping (SAM) table of the nodes configured to run the predetermined program.

It shall be understood that information indicating management actions (e.g., synchronization messages) may be directly sent or received between different node terminals, or the information may be sent through an intermediate component between different node terminals.

As described above, according to the memory access device of this embodiment of the present disclosure, by synchronizing the management actions of the Memories #S of different node terminals, it can be ensured that the Memory #S of each node terminal is a memory backup for each other node. When the software runs at the current node terminal, the local physical memory of the current node terminal corresponding to an address in the global physical address space can be accessed through the address.

According to an embodiment of the present disclosure, a computer-readable storage medium stores a computer program, that when executed by a processor, implements the memory access method based on the NUMA system as described above.

According to an embodiment of the present disclosure, a data storage device comprises a processor and a memory for storing a computer program, which when executed by a processor, implements the memory access method based on the NUMA system as described above.

Figure 9:
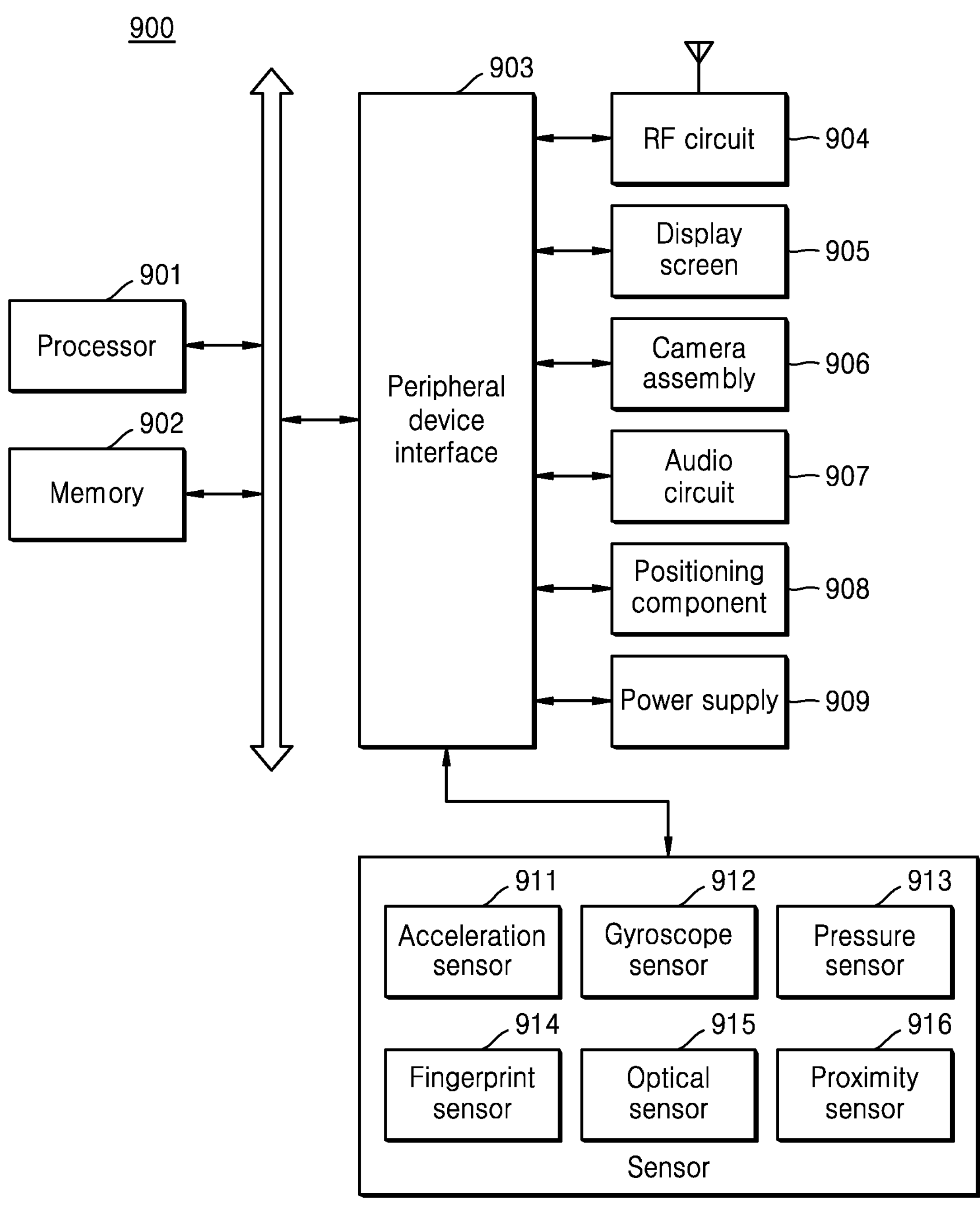
FIG. 9 is a block diagram illustrating a structure of a memory access device for a NUMA system according to another embodiment of the present disclosure.

Turning now to FIG. 9, a memory access device is indicated generally by the reference numeral 900. FIG. 9 illustrates a structure of a memory access device for a NUMA system according to another embodiment of the present disclosure. The device 900 may be, for example, a smart phone, a tablet computer, a Moving Picture Experts Group Audio Layer III (MP3) player, Moving Picture Experts Group Audio Layer IV (MP4) Player, laptop or desktop computer, or the like. The device 900 may also be called user equipment, portable terminal, laptop terminal, desktop terminal and other names without departing from the scope of the present disclosure.

Generally, the device 900 includes a processor 901 and a memory 902.

The processor 901 may include one or more processing cores, such as a 4-core processor, an 8-core processor, or any other positive number of cores or processors. The processor 901 may be implemented in at least one hardware form such as a Digital Signal Processor (DSP), Field Programmable Gate Array (FPGA), Programmable Logic Array (PLA), or the like. The processor 901 may also include a main processor and a slave processor. The main processor is a processor used to process data in an awake state, also called a Central Processing Unit (CPU); the slave processor is a low-power processor used to process data in a standby state. In some embodiments, the processor 901 may be integrated with a Graphics Processing Unit (GPU) used to render and draw content that needs to be displayed on the display screen. In some embodiments, the processor 901 may further include an Artificial Intelligence (AI) processor used to process calculation operations related to machine learning.

The memory 902 may include one or more computer-readable storage media, which may be non-transitory. The memory 902 may also include a high-speed random access memory (RAM) and/or a non-volatile memory (NVM), such as one or more magnetic disk storage devices and/or flash memory storage devices. In some embodiments, the non-transitory computer-readable storage medium in the memory 902 is used to store at least one instruction to be executed by the processor 901 to implement the memory access method based on the NUMA system of the present disclosure.

In some embodiments, the device 900 may optionally further include: a peripheral device interface 903 and at least one peripheral device. The processor 901, the memory 902, and the peripheral device interface 903 may be connected by a bus or a signal line. Each peripheral device may be connected to the peripheral device interface 903 through a bus, a signal line, or a circuit board. The peripheral devices may include: a radio frequency circuit 904, a touch screen 905, a camera 906, an audio circuit 907, a positioning component 908, and a power supply 909.

The peripheral device interface 903 may be used to connect at least one peripheral device related to Input/Output (I/O) to the processor 901 and the memory 902. In some embodiments, the processor 901, the memory 902, and the peripheral device interface 903 are integrated on the same chip or circuit board; in some other embodiments, any one or two of the processor 901, the memory 902, and the peripheral device interface 903 may be implemented on a separate chip or circuit board, which is not limited in this embodiment.

The radio frequency circuit 904 is used for receiving and transmitting Radio Frequency (RF) or electromagnetic signals. The radio frequency circuit 904 communicates with a communications network and other communications devices through electromagnetic signals. The radio frequency circuit 904 converts electrical signals into electromagnetic signals for transmission, or converts received electromagnetic signals into electrical signals. Alternatively, the radio frequency circuit 904 includes: an antenna system, an RF transceiver, one or more amplifiers, a tuner, an oscillator, a digital signal processor, a codec chipset, a user identity module card, or the like. The radio frequency circuit 904 can communicate with other terminals through at least one wireless communications protocol. The wireless communications protocol includes, but is not limited to: metropolitan area networks, various generations of mobile communications networks such as 2G, 3G, 4G, 5G, wireless local area networks and/or Wireless Fidelity (Wi-Fi) networks. In some embodiments, the radio frequency circuit 904 may also include a circuit related to Near Field Communications (NFC), which is not limited in the present disclosure.

The display screen 905 is used to display a User Interface (UI). The UI may include graphics, text, icons, videos, and/or any combination thereof. When the display screen 905 is a touch display screen, the display screen 905 also has an ability to collect touch signals on or above the surface of the display screen 905. The touch signal may be input to the processor 901 as a control signal for processing. At this time, the display screen 905 may also be used to provide virtual buttons and/or virtual keyboards, also called soft buttons and/or soft keyboards. In some embodiments, the display screen 905 may be one display screen, which is arranged on the front panel of the device 900; in other embodiments, the display screen 905 may be at least two display screens 905, which are respectively arranged on different surfaces of the terminal 1000 or in a folded design. In still other embodiments, the display screen 905 may be a flexible display screen, which is arranged on the curved surface or the folding surface of the device 900. Furthermore, the display screen 905 may also be set as a non-rectangular irregular shape, that is, a special-shaped screen. The display screen 905 may be made of materials such as Liquid Crystal Display (LCD), Organic Light-Emitting Diode (OLED), or the like.

The camera assembly 906 is used to capture images or videos. Alternatively, the camera assembly 906 includes a front camera and a rear camera. Generally, the front camera is set on the front panel of the terminal, and the rear camera is set on the back of the terminal. In some embodiments, the rear camera is at least two cameras, each of which is a main camera, a depth-of-field camera, a wide-angle camera, and a telephoto camera, so as to realize a fusion of the main camera and the depth-of-field camera to realize the background blur function, a fusion of the main camera and the wide-angle camera to realize panoramic image acquisition and Virtual Reality (VR) or other fusion acquisition functions. In some embodiments, the camera assembly 906 may also include a flash. The flash may be a single-color temperature flash or a dual-color temperature flash. Dual color temperature flash refers to a combination of warm light flash and cold light flash, which may be used for light compensation under different color temperatures.

The audio circuit 907 may include a microphone and a speaker. The microphone is used to collect sound waves of the user and the environment, and convert the sound waves into electrical signals and input these to the processor 901 for processing, or input to the radio frequency circuit 904 to implement voice communications. For stereo collection or noise reduction, there may be multiple microphones, which are respectively set in different parts of the device 900. The microphone may also be an array microphone or an omni-directional collection microphone. The speaker is used to convert the electrical signal from the processor 901 or the radio frequency circuit 904 into sound waves. The speaker may be a traditional thin-film speaker or a piezoelectric ceramic speaker. When the speaker is a piezoelectric ceramic speaker, it may convert electrical signals into sound waves that are audible to humans, but may also convert electrical signals into sound waves that are inaudible to humans for distance measurement and other purposes. In some embodiments, the audio circuit 907 may also include a headphone jack.

The positioning component 908 is used to locate a current geographic location of the device 900 to implement navigation or Location Based Service (LBS). The positioning component 908 may be a positioning component based on the Global Positioning System (GPS) of the United States, the Beidou system of China, the GLONASS system of Russia, or the Galileo system of the European Union.

The power supply 909 is used to supply power to various components in the device 900. The power supply 909 may be alternating current, direct current, disposable batteries, or rechargeable batteries. When the power supply 909 includes a rechargeable battery, the rechargeable battery may support wired charging or wireless charging. The rechargeable battery may also be used to support fast charging technology.

In some embodiments, the device 900 further includes one or more sensors 910. The one or more sensors 910 include, but are not limited to: an acceleration sensor 911, a gyroscope sensor 912, a pressure sensor 913, a fingerprint sensor 914, an optical sensor 915, and/or a proximity sensor 916.

The acceleration sensor 911 may detect the magnitude of acceleration on the three coordinate axes of the coordinate system established by the device 900. For example, the acceleration sensor 911 may be used to detect the components of gravitational acceleration on three coordinate axes.

The processor 901 may control the touch screen 905 to display the user interface in a horizontal view or a vertical view according to the gravity acceleration signal collected by the acceleration sensor 911. The acceleration sensor 911 may also be used for the collection of game or user motion data.

The gyroscope sensor 912 may detect the body direction and rotation angle of the device 900, and the gyroscope sensor 912 may cooperate with the acceleration sensor 911 to collect the user's 3D actions on the device 900. The processor 901 may implement the following functions according to the data collected by the gyroscope sensor 912: motion sensing such as for changing the UI according to the user's tilt operation, image stabilization during shooting, game control, and inertial navigation.

The pressure sensor 913 may be disposed on a side frame of the device 900 and/or the lower layer of the touch screen 905. When the pressure sensor 913 is arranged on the side frame of the device 900, the user's holding signal for the device 900 may be detected, and the processor 901 performs left and right hand recognition or quick operation according to the holding signal collected by the pressure sensor 913. When the pressure sensor 913 is arranged on the lower layer of the touch display screen 905, the processor 901 controls an operability control element on the UI according to the user's pressure operation on the touch display screen 905. The operability control element includes at least one of a button control element, a scroll bar control element, an icon control element, and/or a menu control element.

The fingerprint sensor 914 is used to collect a user's fingerprint, and the processor 901 identifies the user's identity according to the fingerprint collected by the fingerprint sensor 914, or the fingerprint sensor 914 identifies the user's identity according to the collected fingerprint. When it is recognized that the user's identity is a trusted identity, the processor 901 authorizes the user to perform related sensitive operations, including unlocking a screen, viewing encrypted information, downloading software, paying, and changing settings. The fingerprint sensor 914 may be provided on the front, back or side of the device 900. When the device 900 is provided with a physical button or a manufacturer logo, the fingerprint sensor 914 may be integrated with the physical button or the manufacturer logo, for example.

The optical sensor 915 is used to collect the ambient light intensity. In an embodiment, the processor 901 may control the display brightness of the touch screen 905 according to the intensity of the ambient light collected by the optical sensor 915. When the ambient light intensity is high, the display brightness of the touch display screen 905 is increased; and when the ambient light intensity is low, the display brightness of the touch display screen 905 is decreased. In another embodiment, the processor 901 may also dynamically adjust the image acquisition parameters of the camera assembly 906 according to the ambient light intensity collected by the optical sensor 915.

The proximity sensor 916, also called a distance sensor, may be arranged on a front panel of the device 900. The proximity sensor 916 is used to collect a distance between the user and the front of the device 900. In one embodiment, when the proximity sensor 916 detects that the distance between the user and the front of the device 900 gradually decreases, the processor 901 controls the touch screen 905 to switch from on-screen state to off-screen state; when the proximity sensor 916 detects that the distance between the user and the front of the device 900 gradually increases, the processor 901 controls the touch display screen 905 to switch from the off-screen state to the on-screen state.

It shall be understood that the structure shown in FIG. 9 does not constitute a limitation on the device 900, and may include more or fewer components than shown, or combine certain components, or adopt different component arrangements, without limitation thereto.

According to an embodiment of the present disclosure, a computer-readable storage medium may be provided storing instructions executed by at least one processor, causing the at least one processor to execute the memory access method according to the present disclosure. Examples of computer-readable storage media here include: read-only memory (ROM), random-access programmable read-only memory (PROM), electrically erasable programmable read-only memory (EEPROM), random-access memory (RAM), dynamic random-access memory (DRAM), static random-access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state disk (SSD), card storage such as multimedia card, secure digital (SD) card or extreme digital (XD) card, magnetic tape, floppy disk, magneto-optical data storage device, optical data storage device, hard disk, solid-state disk and/or any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, or the like. In addition, in one example, the computer program and any associated data, data files and data structures are distributed on networked computer systems, so that computer programs and any associated data, data files, and data structures are stored, accessed, and executed in a distributed manner through one or more processors or computers.

According to an embodiment of the present disclosure, a computer program product may also be provided, and instructions in the computer program product may be executed by a processor of a computer device to perform the memory access method based on the NUMA system according to embodiments of the present disclosure.

Those of ordinary skilled in the pertinent art may think of other embodiments of the present disclosure after considering the specification and practicing the teachings disclosed herein. The present disclosure is intended to cover variations, uses, and adaptive changes to the embodiments described herein. These variations, uses, adaptive changes or the like may follow the general principles of the present disclosure and include common knowledge or conventional technical means in the related art whether or not those are specifically described in the present disclosure. The specification and the embodiments are to be regarded as illustrative rather than limiting to the actual scope and spirit of the present disclosure.

Moreover, it is to be understood that the present invention is not limited to the precise structures described above and illustrated in the accompanying drawings, and that various modifications and changes may be made therein without departing from the scope thereof. The scope of the present invention is limited only by the following claims.

What is claimed is:

1. A memory access method for a Non-Uniform Memory Access (NUMA) system, wherein the system comprises a plurality of nodes, each node of the plurality of nodes being configured to run a predetermined program and comprising a preset memory allocated for the predetermined program, wherein a same global physical address corresponds to the preset memory local to each node of the plurality of nodes, the method comprising:

performing a first update operation on the preset memory local to a first node of the plurality of nodes when the predetermined program is running on the first node, wherein performing the first update operation comprises updating a variable;

synchronizing the updating of the variable performed on the preset memory local to the first node with the preset memory local to a second node of the plurality of nodes using a first global physical address;

returning a first synchronization execution result to the first node acknowledging that the second node has updated the variable;

performing a second update operation on the preset memory local to the second node when the predetermined program is running on the second node, wherein performing the second update operation comprises re-updating the variable; and synchronizing the re-updating of the variable performed on the preset memory local to the second node with the preset memory local to the first node using the first global physical address;

returning a second synchronization execution result to the second node acknowledging that the first node has updated the variable, wherein:

each node of the plurality of nodes is configured to access the preset memory local to the each node using the first global physical address when running the predetermined program; and the first global physical address is mapped to the preset memory local to the each node of the plurality of nodes.

2. The memory access method of claim 1, wherein the first update operation comprises at least one of:

requesting the first node to allocate a first physical address for the predetermined program at the preset memory local to the first node;

requesting the first node to update first data stored by the predetermined program in a second physical address of the preset memory local to the first node; or requesting the first node to release second data stored by the predetermined program in a third physical address of the preset memory local to the first node.

3. The memory access method of claim 2, wherein:

when the first update operation includes requesting the first node to allocate the first physical address for the predetermined program at the preset memory local to the first node, the synchronizing of the operation performed on the preset memory local to the first node comprises:

sending a first synchronization message to the preset memory local to each other node to allocate the first physical address to the predetermined program at each of the plurality of nodes;

when the first update operation includes requesting the first node to update the first data stored by the predetermined program in the second physical address of the preset memory local to the first node, the synchronizing of the operation performed on the preset memory local to the first node comprises:

sending a second synchronization message to the preset memory local to each other node to update the first data stored in the second physical address by the predetermined program at each of the plurality of nodes; or when the first update operation includes requesting the first node to release the second data stored by the predetermined program in the third physical address of the preset memory local to the first node, the synchronizing of the first update operation performed on the preset memory local to the first node comprises:

sending a third synchronization message to the preset memory local to each other node to release the second data stored by the predetermined program in the third physical address of the preset memory local to the first node.

4. The memory access method of claim 1, wherein the preset memory local to the each node of the plurality of nodes is a memory backup for other nodes of the plurality of nodes.

5. The memory access method of claim 1, wherein:

the first global physical address is associated with a System Address Mapping (SAM) table of the plurality of nodes configured to run the predetermined program.

6. The memory access method according to claim 1, wherein the plurality of nodes configured to run the predetermined program are all of the nodes of the NUMA system.

7. A memory access device for a Non-Uniform Memory Access (NUMA) system, wherein the system comprises a plurality of nodes, each node of the plurality of nodes being configured to run a predetermined program and comprising a preset memory allocated for the predetermined program, wherein a same global physical address corresponds to the preset memory local to each node of the plurality of nodes, the memory access device being configured to:

perform a first update operation on the preset memory local to a first node of the plurality of nodes when the predetermined program is running on the first node, wherein performing the first update operation comprises updating a variable;

synchronize the updating of the variable performed on the preset memory local to the first node with the preset memory local to a second node of the plurality of nodes using a first global physical address, return a first synchronization execution result to the first node acknowledging that the second node has updated the variable;

perform a second update operation on the preset memory local to the second node when the predetermined program is running on the second node, wherein performing the second update operation comprises re-updating the variable; and synchronize the re-updating of the variable performed on the preset memory local to the second node with the preset memory local to the first node using the first global physical address;

return a second synchronization execution result to the second node acknowledging that the first node has updated the variable, wherein each of the nodes of the plurality of nodes is configured to access the preset memory local to the each node using the first global physical address when running the predetermined program, and the first global physical address is mapped to the preset memory local to the each node of the plurality of nodes.

8. The memory access device of claim 7, wherein the first update operation comprises performing at least one of;

requesting the first node to allocate a first physical address for the predetermined program at the preset memory local to the first node;

requesting the first node to update first data stored by the predetermined program in a second physical address of the preset memory local to the first; and requesting the first node to release second data stored by the predetermined program in a third physical address of the preset memory local to the first node.

9. The memory access device of claim 8, wherein:

when the first update operation includes requesting the first node to allocate the first physical address for the predetermined program at the preset memory local to the first node, the synchronizing comprises sending a first synchronization message to the preset memory local to each other node to allocate the first physical address to the predetermined program at each of the plurality of nodes;

when the first update operation includes requesting the first node to update the first data stored by the predetermined program in the second physical address of the preset memory local to the first node, the synchronizing comprises sending a second synchronization message to the preset memory local to each other node to update the first data stored by the predetermined program in the second physical address at each of the plurality of nodes; or when the first update operation includes requesting the first node to release the second data stored by the predetermined program in the third physical address of the preset memory local to the first node, the synchronizing comprises sending a third synchronization message to the preset memory local to each other node to release the second data stored by the predetermined program in the third physical address of the preset memory local to the first node.

10. The memory access device of claim 7, wherein the preset memory local to the each node of the plurality of nodes is a memory backup for other nodes of the plurality of nodes.

11. The memory access device of claim 7, wherein the first global physical address is associated with a System Address Mapping (SAM) table of the plurality of nodes configured to run the predetermined program.

12. The memory access device of claim 7, wherein the plurality of nodes configured to run the predetermined program are all of the nodes of the NUMA system.

13. A Non-Uniform Memory Access (NUMA) system comprising:

a plurality of nodes, each node of the plurality of nodes being configured to run a predetermined program and comprising a preset memory allocated for the predetermined program, wherein a same global physical address corresponds to the preset memory local to each node of the plurality of nodes;

wherein the NUMA system is configured to:

perform a first update operation on the preset memory local to a first node of the plurality of nodes when the predetermined program is running on the first node, wherein performing the first operation comprises updating a variable;

synchronize the updating of the variable performed on the preset memory local to the first node with the preset memory local to a second node of the plurality of nodes using a first global physical address;

return a first synchronization execution result to the first node acknowledging that the second node has updated the variable;

perform a second update operation on the preset memory local to the second node when the predetermined program is running on the second node, wherein performing the second update operation comprises re-updating the variable; and synchronize the re-updating of the variable performed on the preset memory local to the second node with the preset memory local to the first node using the first global physical address;

return a second synchronization execution result to the second node acknowledging that the first node has updated the variable, wherein each of the plurality of nodes is configured to access the preset memory local to the each node using the first global physical address when running the predetermined program, and the first global physical address is mapped to the preset memory local to the each node of the plurality of nodes.

14. The NUMA system of claim 13, wherein the first update operation comprises at least one of;

requesting the first node to allocate a first physical address for the predetermined program at the preset memory local to the first node;

requesting the first node to update first data stored by the predetermined program in a second physical address of the preset memory local to the first node; and requesting the first node to release second data stored by the predetermined program in a third physical address of the preset memory local to the first node.

15. The NUMA system of claim 14, wherein:

when the first update operation includes requesting the first node to allocate the first physical address for the predetermined program at the preset memory local to the first node, the synchronizing comprises sending a first synchronization message to the preset memory local to each other node to allocate the first physical address to the predetermined program at each of the plurality of nodes;

when the first update operation includes requesting the first node to update the first data stored by the predetermined program in the second physical address of the preset memory local to the first node, the synchronizing comprises sending a second synchronization message to the preset memory local to each other node to update the first data stored by the predetermined program in the second physical address at each of the plurality of nodes; or when the first update operation includes requesting the first node to release the second data stored by the predetermined program in the third physical address of the preset memory local to the first node, the synchronizing comprises sending a third synchronization message to the preset memory local to each other node to release the second data stored by the predetermined program in the third physical address of the preset memory local to the first node.

16. The NUMA system of claim 13, wherein the preset memory local to the each node of the plurality of nodes is a memory backup for other nodes of the plurality of nodes.

17. The NUMA system of claim 13, wherein the first global physical address is associated with a System Address Mapping (SAM) table of nodes configured to run the predetermined program.

18. The NUMA system of claim 13, wherein the plurality of nodes configured to run the predetermined program are all of the nodes of the NUMA system.

19. The NUMA system of claim 13, wherein at least one of the plurality of nodes comprises memory in addition to the preset memory local to the at least one of the plurality of nodes.

20. The NUMA system of claim 13, wherein at least one of the plurality of nodes comprises at least one processor or core.

* * * * *